Oct. 17, 1961  W. R. E. HENSEL  3,004,451
CHANGE-SPEED TRANSMISSION, PARTICULARLY FOR MOTOR VEHICLES
Filed Aug. 6, 1958  2 Sheets-Sheet 1
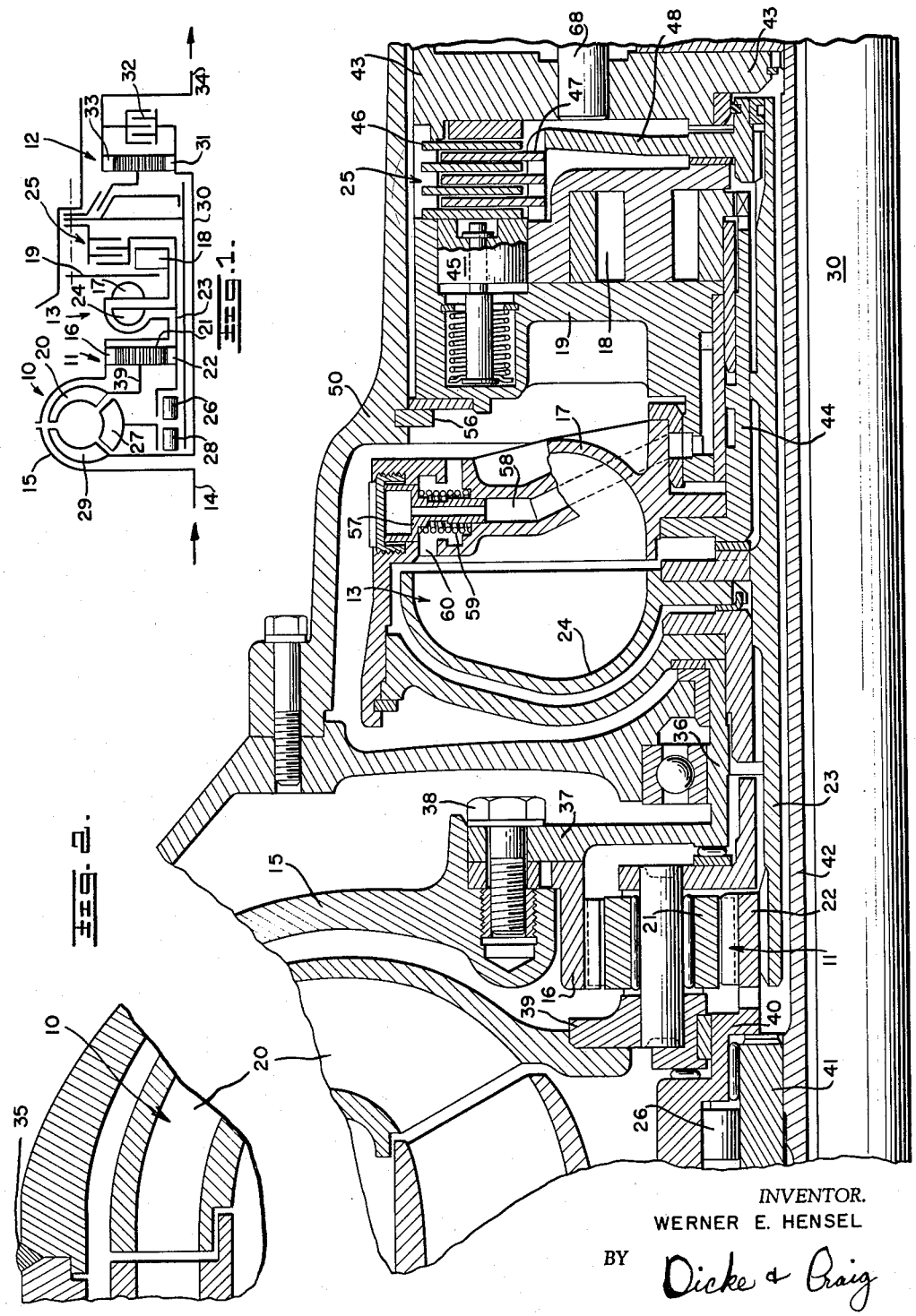
INVENTOR.
WERNER E. HENSEL
BY Dicke & Craig
ATTORNEYS

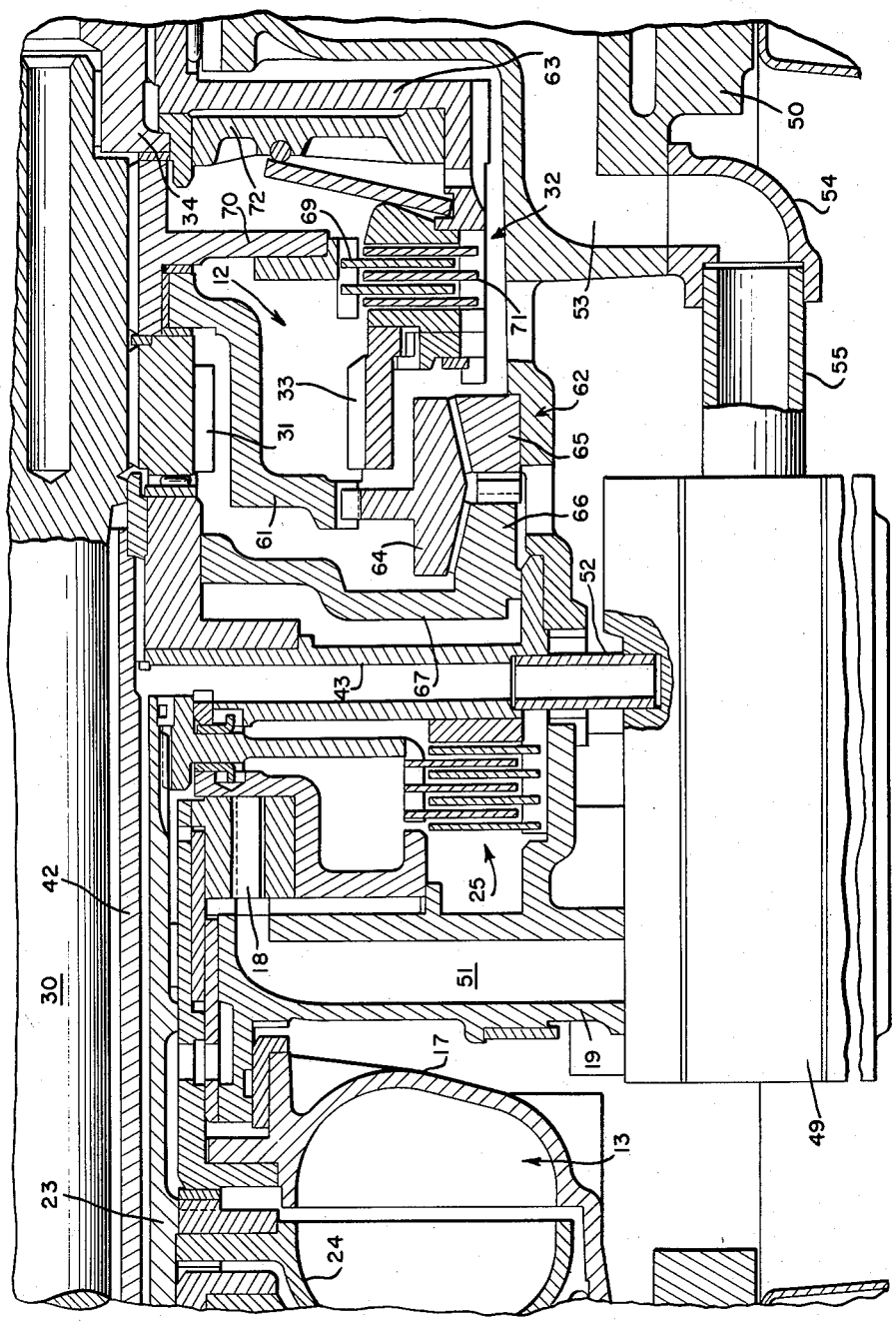

United States Patent Office 3,004,451
Patented Oct. 17, 1961

3,004,451
CHANGE-SPEED TRANSMISSION, PARTICULARLY FOR MOTOR VEHICLES
Werner R. E. Hensel, Fellbach, near Stuttgart, Germany, assignor to Daimler-Benz Aktiengesellschaft, Stuttgart-Unterturkheim, Germany
Filed Aug. 6, 1958, Ser. No. 753,517
Claims priority, application Germany Aug. 7, 1957
28 Claims. (Cl. 74—688)

The present invention relates to a change-speed transmission particularly for motor vehicles, which consists of a hydro-dynamic torque converter with a mechanical change-speed gear preceding and another mechanical change-speed gear following the hydrodynamic torque converter, i.e., with one mechanical change-speed gear each connected in the input and in the output of the hydrodynamic device.

For purposes of convenience, the mechanical change-speed gear which is connected ahead of the torque converter will be designated hereinafter as "input" or "front" change-speed gear or planetary gear, while the mechanical change-speed gear connected to the rear of the torque converter will be designated herein as "output" or "rear" change-speed gear or planetary gear.

Change-speed transmissions are known in the prior art in which a mechanical gear precedes and another mechanical gear follows a hydro-dynamic torque converter. In connection therewith, the preceding or input gear is constructed as a power divider and, with the output of the transmission at a standstill, thereby drives the pump wheel or impeller of the torque converter with a higher or increased rotational speed which steadily decreases thereupon in proportion to the increase in speed of the secondary drive.

It is desirable with such arrangements to shift the torque converter at will to a lower speed with respect to the drive or input speed because, as a result thereof, a greater amount of available potential can be provided rapidly, for example, for purposes of passing another vehicle. Simultaneously therewith, it is a further aim to attain braking by hydrodynamic means in addition to the braking normally available by means of the engine.

The present invention consists in that the preceding or input change-speed gear is constructed as a planetary gear in a manner known per se and that this mechanical change-speed gear is adapted to be selectively shifted by means of a hydrodynamic coupling having a controllable or regulatable filling thereof with fluid and that, for purposes of simultaneous use thereof as a vehicle brake, the secondary member or part of the hydrodynamic coupling is adapted to be connected with the relatively stationary transmission housing.

A selectively operable drainage valve which can be operated at will, for example, by a kick-down mechanism, is advantageously arranged in the primary member or part of the hydrodynamic coupling for purposes of shifting the preceding or input change-speed gear while, for purposes of obtaining a braking effect, a valve having a throttled discharge is arranged therein whereby the supply to the hydrodynamic coupling is also adjustably controllable.

The arrangement is thereby appropriately so made that the outer, internal hollow gear wheel of the preceding or input planetary gear is connected with the input or drive and with the primary or input member of the hydrodynamic coupling, whereas the planet carrier is connected with the pump wheel or impeller of the torque converter, and the sun gear thereof is connected with the secondary or output member of the hydrodynamic coupling. The secondary member of the hydrodynamic coupling is mounted on a hollow shaft which carries within the forward region thereof the sun gear wheel of the preceding or input planetary gear and which is possibly supported against a relatively stationary part of the transmission housing by means of a freewheeling device, whereas within the rear region thereof the hollow shaft is connected with a clutch for purposes of connection thereof with a partition wall or any other relatively stationary part of the housing.

The construction according to the present invention enables a more advantageous utilization of the torque converter which rotates in the normal operating range at the speed of the input or drive and thereby operates with smaller power losses. By selectively shifting the transmission, the torque converter is adapted to be driven at a geared-down speed with the shifting hydrodynamic coupling drained so that a greater power potential is made available. This can be attained with any engaged speed of the output or rearward mechanical change-speed gear. Furthermore, there exists the possibility to increase effectively the braking effect of the engine with the controllable hydrodynamic braking.

According to another feature of the present invention, another housing partition wall may be provided and the primary member of the hydrodynamic coupling may be extended through this partition wall with a hollow hub portion thereof for the drive of the primary oil pump which together with the friction-disk clutch is arranged between both housing partitions for the purpose of braking the secondary member of the hydrodynamic coupling. This may be further improved and refined in accordance with the present invention by fastening the shifting plate provided to accommodate the automatic shifting mechanism of the transmission to the partition wall carrying the primary pump, and possibly to the first-mentioned partition wall of the transmission housing, and by arranging all important conduits or lines for the pressure medium normally accommodated within the housing, within these partition walls. In this manner the manufacture of the housing is greatly simplified by reason of the absence or omission of the many bores, passages and channels normally found therein.

According to another feature of the present invention the primary part or member of the hydrodynamic coupling is detachably connected with the driving member by means of a hollow hub portion having a flange-shaped disk element along such a diameter that all elements of the torque converter which are subject to wear, such as for instance, the freewheeling devices and the bearings, as well as the input planetary change-speed gear may be disassembled with the converter housing remaining closed or assembled. A more simple and space-saving manufacture of the torque converter unit which, for example, may be welded together and also a simpler assembly thereof results therefrom. The hydrodynamic coupling may be provided with blades that are inclined forwardly or are spirally curved in order to increase the power transmitting capacity thereof with the same diameter.

Accordingly, it is an object of the present invention to provide a change-speed gear for motor vehicles in which a mechanical change-speed gear is connected ahead of and to the rear of a torque converter and which is particularly favorable as regards its performance as an automatic transmission.

It is another object of the present invention to provide a change-speed transmission for motor vehicles including a torque converter and a mechanical change-speed gear connected ahead of and to the rear of the torque converter which makes readily available an increase in torque for purposes of sudden accelerations, for example, when passing a motor vehicle.

Another object of the present invention resides in the provision of a change-speed transmission including a hydrodynamic device and mechanical change-speed gear means connected to the input and output thereof which makes it possible to obtain an effective braking aid by means of the hydrodynamic device additional to the braking effect normally obtainable by the engine.

A further object of the present invention resides in the provision of a change-speed transmission which is relatively simple and inexpensive to manufacture.

Still another object of the present invention resides in the provision of a change-speed transmission of the automatic type in which the manufacture of the transmission casing is greatly simplified by placing most of the significant parts of the automatic control mechanism for the transmission into sub-assemblies which may be readily installed into the transmission housing thereby obviating the need for complicated castings and machining of the transmission.

Still another object of the present invention is the provision and construction of a change-speed transmission which facilitates the accessibility and repairs, particularly of those parts subject to wear and tear during operation thereof.

A still further object of the present invention resides in the provision of a compact change-speed transmission including hydrodynamic and mechanical change-speed means in which the various parts may be readily sub-assembled so as to facilitate assembly of the transmission, reduce the cost of manufacture thereof, enable ready accessibility for purposes of repair and minimize the number of spare parts which must be carried by repair shops.

These and other objects, features and advantages of the present invention will become more obvious from the following description when taken in connection with the accompanying drawing which shows for purposes of illustration only, one embodiment in accordance with the present invention and wherein:

FIGURE 1 is a schematic overall view of the transmission in accordance with the present invention, and FIGURES 2 and 3 are partial axial cross sectional views through portions of the transmission illustrated in FIGURE 1, in longitudinal axial cross section and showing certain structural details thereof.

Referring now to the drawing, wherein like reference numerals are used throughout the various views to designate like parts, and more particularly to FIGURE 1 thereof, the transmission shown therein consists of the hydrodynamic torque converter generally designated by reference numeral 10, the front or input planetary gear generally designated by reference numeral 11 and the rear or output planetary gear generally designated by reference numeral 12. The input or front planetary gear 11 may be selectively shifted, for instance, from a kick-down mechanism of conventional construction, by means of the hydrodynamic coupling 13 which is adapted to be controlled in the fluid filling thereof, whereby the hydrodynamic coupling is additionally utilized for a controllable hydrodynamic braking.

The drive or input takes place from the drive shaft 14 over the housing 15 of the torque converter 10 to the external hollow or ring gear wheel 16 of the front or input planetary gear 11. The primary member 17 of the hydrodynamic coupling 13 and the primary oil pump 18 which is arranged at a partition wall 19 of the housing are connected with the gear wheel 16. The impeller 20 of the torque converter 10 is operatively connected with the planet carrier 39 of the front or input planetary gear 11. The sun gear 22 is mounted on a hollow shaft 23 with which are operatively connected the secondary member 24 of the hydrodynamic coupling 13 and an engageable means 25, for instance, a friction-disk brake, for connecting the same to the transmission housing. The hollow shaft 23 may be supported by means of a freewheeling device 26 against the transmission housing. The guide wheel 27 or guide wheels respectively of torque converter 10 may also be supported against the relatively stationary transmission housing, in a manner known per se, by means of a freewheeling device 28.

The transmission of torque or drive takes place from the turbine wheel 29 of torque converter 10 over an intermediate shaft 30 to the sun gear 31 of the output or rear planetary gear 12 and simultaneously therewith to a clutch, for instance, a friction-disk clutch 32, which serves to lock the planetary gear 12 in itself. The driven or output shaft 34 is driven by the external hollow or ring gear wheel 33 of the planetary gear 12 or by clutch 32 respectively.

*Operation*

When the hydrodynamic coupling 13 is filled with fluid, the front or input planetary gear 11 is effectively locked so that the sun gear 22 thereof revolves at approximately the same speed as the internal gear wheel 16, if the slight slippage in the coupling 13 is disregarded. The entire front or input planetary gear 11 is thereby effectively locked together so that the impeller 20 of torque converter 10 is driven at the engine speed. In this normal operating range, the torque converter 10 operates with relatively slight power losses. If the hydrodynamic coupling 13 is now drained or emptied, then the hollow shaft 23 and therewith the sun gear wheel 22 support themselves at the freewheeling device 26 which is operative to prevent rotation of hollow shaft 23 and of sun gear 22 in the opposite direction and, therefore, acts as a one-way brake to retain hollow shaft 23 and sun gear 22 stationary or the hollow shaft 23 and sun gear 22 are directly braked by means of engageable brake 25 so that the speed reduction or gear reduction of the front or input planetary gear 11 is engaged. The impeller 20 of the torque converter 10 is now driven at a reduced or geared-down speed with respect to the engine speed or speed of input shaft 14 thereby resulting in a substantial increase in available power potential, whereby a somewhat greater power loss is accepted in favor of the increased acceleration which may be attained thereby.

For purposes of obtaining a braking effect, the hollow shaft 23 and the secondary member 24 of the hydrodynamic coupling 13 are held stationary by means of brake 25. The primary member 17 of hydrodynamic coupling 13 and the engine will now be driven over the input planetary gear 11 by the torque converter 10, and more particularly at a geared-up or higher speed. By controlling the fluid filling of the hydrodynamic coupling 13 it will now be possible to attain a controllable braking, particularly within the range of lower driving speeds.

As shown in FIGURES 2 and 3, the torque converter housing 15 is constructed in two sections and is connected by a central welding seam 35. The hollow internal or ring gear 16 is fastened to the torque converter housing 15 along such a diameter that the elements or parts of the front or input planetary gear 11 as well as all other parts of the torque converter 10 which are subject to wear such as, for instance, the bearings and freewheeling devices thereof, may be readily disassembled. For this purpose the primary member 17 of the hydrodynamic coupling 13 which simultaneously forms the housing of this coupling 13, is connected with the torque converter housing 15 by means of a hub portion 36 which passes over into a flange portion 37 at the forward end thereof. The flange portion 37 is fastened to the torque converter housing 15 by means of bolts 38 or by some other suitable means whereby, simultaneously therewith, the outer hollow or ring gear 16 is also secured to the assembly consisting of torque converter housing 15, flange portion 37, hub portion 36 and hydrodynamic coupling housing and primary member 17 thereof.

The planetary gears 21 are secured by means of planet carrier 39 to the impeller or pump wheel 20 of the torque converter 10. The sun gear 22 is splined to hollow shaft 23 or is fastened thereto in any other suitable manner and is supported at the freewheeling device 26 by means of an extension portion 40 which is step-shaped in cross-section. The freewheeling device 26 is seated on a ring 41 of the hollow stub shaft 42 which in turn is rigidly connected to a housing partition wall 43. One or several guide wheels 27 of the torque converter 10 are supported against this same ring 41 over the freewheeling device 28 (FIGURE 1).

The primary member 17 of the hydrodynamic coupling 13 is extended by means of a connecting shaft 44 through a partition wall 19 for purposes of providing a drive for the primary oil pump 18 which is accommodated by partition wall 19 and is physically located between the two fixed partition walls 19 and 43 of the transmission housing. The brake 25, constructed as a friction-disk brake, is located within the same area which serves for purposes of connecting the hollow shaft with the fixed or relatively stationary transmission housing. The actuation and engagement of brake 25 takes place by means of hydraulic pistons 45. The outer friction disks 46 of the clutch 25 are arranged at and secured to the same fixed partition wall 43 of the housing as the fixed hollow shaft 42. The inner disks 47 are coordinated or operatively connected with a disk support carrier 48 which is fastened to the rear end of the hollow shaft 23 by means of a splined connection or in some other suitable manner.

The shifting control housing 49 (FIGURE 3) is fastened to the bottom of the housing partition wall 19 and possibly also to the bottom of partition wall 43, the shifting control housing 49 containing all elements of the automatic shifting mechanism for the transmission, i.e., all pistons and ducts necessary for this purpose. This arrangement makes it possible to place or accommodate within partition wall 19 or partition walls 19 and 43 respectively all essential lines or conduits for the pressure medium extending from the shifting plate 49 to the respective elements so that the housing 50 of the transmission is relieved of these conduits and may be thereby manufactured more simply and inexpensively. For example, the oil pump 18 may be connected over the duct 51 (FIGURE 3) with the shifting control housing 49, for instance, in the form of a pressure connection. Insertion pieces 52 are provided for the transition or connection from the pressure medium lines to the partition walls. Only relatively few lines or conduits remain within housing 50, such as, for example, the connecting line 53 to the secondary oil pump which is led to the shifting plate 49 over an elbow conduit portion 54 and over the insertion piece 55.

Both partition walls 19 and 43 are non-rotatably inserted into the housing 50 and are fastened or secured therein by a lock ring 46 or by a similar means. However, it is also possible to fasten the partition walls 19 and 43 within housing 50 by means of several bolts extending parallel to the axis thereof.

For purposes of rapidly discharging or emptying the coupling 13 for shifting purposes, a valve piston 57 is engaged in the primary member 17 thereof. During normal operation, the piston 57 is pressed inwardly by the pressure fluid supplied thereto through a bore 58 in opposition to the force exerted thereon by spring 59 and thereby closes the discharge bore or port 60. If the pressure prevailing in duct 58 is removed or relieved, for instance, by actuating a kick-down mechanism, then the valve piston 57 will move rapidly outwardly due to the spring and centrifugal forces into the position thereof shown in the drawing so that the discharge port 16 is rendered open and the coupling 13 is emptied of all fluid. As a result thereof, the reduced or geared-down drive of the torque converter 10 becomes thereby engaged in the manner already described hereinabove.

For purposes of engaging the hydrodynamic brake, a throttle valve (not shown by the drawing) is also provided in the primary member 17 of the hydrodynamic coupling 13. This throttling valve releases under pressure a certain predetermined throttled drainage or discharge cross section with the result that a certain small amount of oil flows constantly through the hydrodynamic coupling 13 for cooling purposes. The control of the fluid filling of the hydrodynamic coupling takes place by means of the inlet or supply thereof so that any desired braking effect may be accomplished.

It may be appropriate to provide the hydrodynamic shifting coupling 13 with blades tilted or inclined forwardly or with blades spirally or helically curved forwardly. In this manner the power transmitting capacity thereof is increased so that the hydrodynamic coupling may be realized and constructed with smaller diametric dimensions. In that case there exists also the possibility of a more practical manufacture by means of casting in that the mold may be withdrawn along a helically formed casting, as more fully disclosed in the copending application S.N. 730,197, filed April 22, 1958 entitled "Hydrodynamic Coupling," and assigned to the assignee of the present application.

The transmission of power or torque takes place from the turbine wheel 29 of the torque converter 10 over the intermediate central shaft 30 to the sun gear 31 (FIGURE 3) of the rear or output planetary gear 12 which need not be constructed in the manner shown in the illustrated embodiment but may be arranged and constructed in any other appropriate manner giving the desired transmission ratios without departing from the scope of the present invention. For example, any suitable arrangement of a planetary gear such as a twin planetary gear or the like producing several transmission speeds or ratios including a reverse ratio or any other analogous mechanical change-speed gear such as a countershaft transmission may be used for purposes of the present invention, though a planetary gear is particularly suitable because of the compactness thereof and because of the resulting relatively small overall dimension of the transmission. The planet carrier 61 of output or rear planetary gear 12 is adapted to be held in place or stationary with respect to housing 50 by means of a cone-friction brake generally designated by reference numeral 62 or by means of any other suitable connecting means. The transmission of torque takes place from the external or ring gear 33 over an intermediate part 63 to the driven or output shaft 34. The same gear wheels may be used as internal ring gear and as planetary gears in the output planetary gear 12 as are used with the front or input planetary gear 11.

The cone-friction brake 62 is constructed as double cone-friction brake, the inner part 64 of which is operatively connected with the planet carrier 61. One part 65 of the outer cone components of brake 62 is held in place or secured within the housing 50, while the other part 66 thereof forms simultaneously the pressure piston 67 for the engagement of the brake 62 and is non-rotatably secured in the housing partition wall 43 by means of pins 68 (FIGURE 2). It is possible and advantageous to secure the brake part 65 together with the partition walls 19 and 43 within the housing 50.

The rear or output planetary gear 12 may be locked together by means of the friction-disk clutch 32. The inner friction disks 69 of clutch 32 are arranged on clutch support or carrier 70 and are thereby connected directly with the intermediate shaft 30. The outer friction disks 71 are arranged within the intermediate part 63. The actuation of clutch 32 takes place by means of an annular piston 72 which is located in the intermediate part 63.

When the clutch 32 is engaged, the transmission of power or torque takes place directly from the intermediate shaft 30 over the intermediate part 63 to the output or driven shaft 34. The rear or output planetary gear 12 thereby idles. If now the clutch 32 is released or disengaged and the cone brake 62 is engaged instead, then the planet carrier 61 is held stationary against the housing, and the transmission of power or torque takes place from the intermediate shaft 30 over the rear planetary gear 12 with a reversal of the direction of rotation to the intermediate part 63 and therewith to the driven or output shaft 34.

While I have shown and described several embodiments in accordance with the present invention, it is understood that the same is not limited thereto but is susceptible of many changes and modifications in accordance with the present invention. For example, any suitable type of hydrodynamic devices may be used for the torque converter 10 and the coupling 13.

Moreover, any suitable conventional type of clutches, brakes and freewheeling devices or one-way engaging means may be used for the corresponding elements of the transmission. Additionally, the type of mechanical change-speed gear connected to the input and output of the torque converter may be of any suitable type. Thus, it is obvious that the present invention is not limited to the specific embodiment illustrated herein but is susceptible of many changes and modifications and I, therefore, intend to cover all such changes and modifications as encompassed by the scope of the appended claims.

Any suitable automatic control mechanism of conventional construction may be used in connection with the actuation of the various elements to produce the desired control functions.

I claim:

1. A change-speed transmission having a transmission input shaft and a transmission output shaft and provided with a relatively stationary part, particularly for motor vehicles, comprising torque converter means provided with input means and output means, mechanical change-speed gear means drivingly connecting said input shaft only with said input means, means including further change-speed gear means operatively connecting said output shaft with said output means of said torque-converter means, and hydrodynamic coupling means having two rotatable elements for selectively shifting said first-mentioned change speed gear means including means for selectively varying the filling of said hydrodynamic coupling means and means for selectively connecting one of said rotatable elements with said relatively stationary housing to use said hydrodynamic coupling means as a continuously variable vehicle brake.

2. A change-speed transmission according to claim 1 wherein said hydrodynamic coupling means includes a primary member and a secondary member, discharge valve means in said primary member to effect shifting of said first-mentioned change-speed gear means, throttle discharge valve means in said primary part and means for controlling the supply of fluid medium to said hydrodynamic coupling means to control the same as brake.

3. A change-speed transmission according to claim 2 further comprising kick-down control means for actuating said first-mentioned valve means.

4. A change-speed transmission having a relatively stationary part, especially for motor vehicles comprising an input shaft, an output shaft, a hydrodynamic torque converter with an input and output, planetary gear means operatively connecting said input shaft only with said input of said torque converter, and mechanical change-speed gear means operatively connecting said output shaft only with said output, both of said gear means being adapted to be selectively shifted independently of each other, said planetary gear means being a speed-reduction gear, and means including a hydrodynamic coupling having a primary and secondary member with means for selectively controlling the filling thereof for selectively shifting said planetary gear means and means for selectively connecting said secondary member to said relatively stationary part to use said hydrodynamic coupling as hydrodynamic brake.

5. A change-speed transmission according to claim 4 further comprising valve means in said primary member to control the shifting of said planetary gear means with means for selectively actuating said valve means, and throttled discharge means and controllable supply means for said hydrodynamic coupling to control the same for operation as hydrodynamic brake.

6. A change-speed transmission having a relatively stationary part, and with transmission input means, especially for motor vehicles, comprising a torque converter with an impeller and a turbine wheel, planetary gear means including a ring gear, a planet carrier and a sun gear, a mechanical change-speed gear means operatively connected with said turbine wheel, both of said gear means being adapted to be selectively shifted independently of each other, said planetary gear means being a speed-reduction gear, and means including a hydrodynamic coupling having a primary and secondary member with means for selectively controlling the filling thereof for selectively shifting said planetary gear means and means for selectively connecting said secondary member to said relatively stationary part to use said hydrodynamic coupling as a hydrodynamic brake, the ring gear of said planetary gear means being operatively connected with said transmission input means and with said primary member, the planet carrier of said planetary gear means being operatively connected with said impeller wheel of said torque converter, and the sun gear of said planetary gear means being operatively connected with said secondary member of said hydrodynamic coupling.

7. A change-speed transmission according to claim 6 further comprising a hollow shaft, means operatively connecting said secondary member with said hollow shaft, said sun gear being mounted on said hollow shaft in the forward region thereof, engaging means operatively connecting said hollow shaft in the forward region with said relatively stationary part and engaging means for selectively connecting said hollow shaft in the rear region thereof with said relatively stationary part.

8. A change-speed transmission according to claim 7 wherein said first-mentioned engaging means is a one-way engaging means and wherein said second engaging means is a selectively engageable friction disk brake.

9. A change-speed transmission according to claim 8 further comprising partition wall means in said transmission connected with said relatively stationary part and hollow means for supporting the guide wheel of said torque converter as well as said sun gear at said partition wall means, and wherein said means for selectively connecting said secondary member to said relatively stationary part is a friction disk clutch with some of the friction disks thereof carried on said hollow means.

10. A change-speed transmission according to claim 9 further comprising additional partition wall means, a primary oil pump, and means including a hollow portion of said primary member extending through said additional partition wall means for purposes of driving said primary oil pump and for supporting thereon some of said friction disks.

11. A change-speed transmission having an automatic shifting mechanism according to claim 10 further comprising shifting control housing means containing the automatic shifting mechanism secured to said additional partition wall means whereby at least most of the important pressure lines and conduits for said automatic shifting mechanism are arranged in said shifting-control housing means and said partition wall means.

12. A change-speed transmission according to claim 11 wherein said shifting control housing means is also connected to the other of said partition wall means.

13. A change-speed transmission having an automatic shifting mechanism and a relatively stationary part, especially for motor vehicles, comprising a hydrodynamic torque convertor with an input and an output, planetary gear means operatively connected with said input, mechanical change-speed gear means operatively connected with said output, both of said gear means being adapted to be selectively engaged independently of each other, said planetary gear means being a speed-reduction gear, means including a hydrodynamic coupling having a primary and secondary member with means for selectively controlling the filling thereof for selectively engaging said planetary gear means, means for selectively connecting said secondary member to said relatively stationary part to use said hydrodynamic coupling as hydrodynamic brake, partition wall means in said transmission, pump means, means for journaling said primary and secondary members of said hydrodynamic coupling in said partition wall means, shifting control housing means containing the automatic shifting mechanism, and means operatively securing said shifting-control housing means to said partition wall means whereby most of the pressure line conduits for said automatic shifting mechanism are contained in said shifting plate means and said partition wall means.

14. A change-speed transmission according to claim 13 wherein two partition walls are provided, wherein said mechanical change-speed gear means includes engageable means for shifting the transmission ratio thereof and means for securing in said relatively stationary part said two transmission walls as well as a part of said last-mentioned engageable means.

15. A change-speed transmission according to claim 14 wherein said last-mentioned engageable means is a friction disk clutch having a relatively stationary clutch member secured to said relatively stationary part by said securing means.

16. A change-speed transmission according to claim 15 wherein said relatively stationary clutch part is a conical friction element.

17. A change-speed transmission having a relatively stationary part, especially for motor vehicles, comprising a hydrodynamic torque converter with an input and an output, planetary gear means operatively connected with said input, mechanical change-speed gear means operatively connected with said output, both of said gear means being adapted to be selectively shifted independently of each other, said planetary gear means being a speed-reduction gear, means including a hydrodynamic coupling having a primary and secondary member with means for selectively controlling the filling thereof for selectively shifting said planetary gear means, means for selectively connecting said secondary member to said relatively stationary part to use said hydrodynamic coupling as hydrodynamic brake, and transmission input means, said primary member including a hollow portion terminating in a flange-like disk-shaped part, and said flange-like disk-shaped part being detachably connected with said transmission input means on such a diameter that all parts of said torque converter as well as of said planetary gear means may be disassembled with the torque converter housing remaining closed.

18. A change-speed transmission according to claim 1 wherein said hydrodynamic coupling means includes blade means inclined forwardly.

19. A change-speed transmission according to claim 18, said blade means being helically shaped.

20. A change-speed transmission according to claim 4, wherein said mechanical change-speed gear means is also a planetary gear.

21. A change-speed transmission according to claim 20, wherein said input of the torque converter is operatively connected with the impeller thereof wherein the output of said torque converter is operatively connected with the turbine wheel thereof and wherein said torque converter includes guide wheel means and one-way engaging means operatively connecting said guide wheel means with said relatively stationary part.

22. A change-speed transmission according to claim 21 wherein said first-mentioned planetary gear means includes a sun gear, and means including one-way engaging means and selectively engageable means for connecting said sun gear with said relatively stationary part.

23. A change-speed transmission having a relatively stationary part, and a transmission input, especially for motor vehicles, comprising a hydrodynamic torque convertor with an impeller, a turbine wheel and guide wheel means, planetary gear means including a sun gear, a planet carrier carrying thereon at least one planet wheel and a ring gear, further planetary gear means operatively connected with said turbine wheel of said torque convertor, both of said gear means being adapted to be selectively shifted independently of each other, said first-mentioned planetary gear means being a speed-reduction gear, and means including a hydrodynamic coupling having a primary member and a secondary member with means for selectively controlling the filling thereof for selectively shifting said planetary gear means, means for selectively connecting said secondary member to said relatively stationary part to use said hydrodynamic coupling as hydrodynamic brake, one way engaging means operatively connecting said guide wheel means with said relatively stationary part, means including one way engaging means for connecting said sun gear with said relatively stationary part, said planet carrier being operatively connected with said impeller, and said ring gear being operatively connected with both said transmission input and with said primary member of said hydrodynamic coupling.

24. A change-speed transmission according to claim 23 wherein said secondary member is operatively connected with said sun gear.

25. A change-speed transmission according to claim 24 wherein said mechanical change-speed gear means is a planetary gear having a ring gear, a sun gear and a planet carrier with at least one planet wheel thereon in meshing engagement with said ring gear and sun gear, means operatively connecting said last-mentioned sun gear with said hydrodynamic torque converter output, means connecting the transmission output with said last-mentioned ring gear and engageable means for connecting said last-mentioned planet carrier with said relatively stationary part.

26. A change-speed transmission according to claim 25 further comprising means for locking together said second-mentioned planetary gear.

27. A change-speed transmission having an input member and an output member and provided with a relatively stationary part, comprising a torque converter having impeller means and turbine means, speed-reduction mechanical change-speed gear means with input means and output means operatively connected respectively only with said input member and with said impeller means to drive the latter either essentially at the speed of said input member or at reduced speed with respect thereto, a hydrodynamic coupling having a driving member and a driven member and operatively connected with the driving member thereof to said input means and with the driven member thereof to said output means of said mechanical change-speed gear means to enable an essentially one-to-one drive therebetween, means for selectively rendering said hydrodynamic coupling operative or inoperative to transmit torque therethrough to thereby drive said impeller means either essentially at the speed of said input means or at said reduced speed, means for selectively connecting said driven member to said relatively stationary part to use said hydrodynamic coupling as a hydrodynamic brake, and means drivingly connecting said transmission output member only with said turbine means so that all the torque transmitted has to pass through said torque converter.

28. A change-speed transmission having an input shaft and an output shaft and provided with a relatively stationary part, comprising a torque converter having impeller means and turbine means, speed-reduction planetary change-speed gear means having a plurality of elements including a ring gear, a sun gear, at least one planet gear in meshing engagement with said ring and sun gears and supported on a planet carrier, said ring gear being operatively connected with said input shaft and said planet carrier only with said impeller means to drive the latter either essentially at the speed of said input shaft or at reduced speed with respect thereto, a hydrodynamic coupling having a driving member and a driven member and operatively connected with the driving member thereof to one of said elements of said planetary gear means and with the driven member thereof to another element of said planetary gear means to enable lock-up thereof, means for selectively rendering said hydrodynamic coupling operative or inoperative to transmit torque therethrough to thereby drive said impeller means either essentially at the speed of said input means or at said reduced speed, means for selectively connecting said driven member to said relatively stationary part to use said hydrodynamic coupling as a hydrodynamic brake, and means drivingly connecting said transmission output member with said turbine means.

References Cited in the file of this patent

UNITED STATES PATENTS

| | | |
|---|---|---|
| 2,408,988 | McElroy | Oct. 8, 1946 |
| 2,687,657 | Kugel et al. | Aug. 31, 1954 |
| 2,851,906 | De Lorean | Sept. 16, 1958 |
| 2,876,656 | Herndon | Mar. 10, 1959 |

OTHER REFERENCES

1957 Pontiac Strato-of Light Hydra-matic Manual (with 1956 appendix); published March 1957 by Pontiac Division, General Motors Corporation; pages 10 and 11.